United States Patent [19]
Smith

[11] 3,799,991
[45] Mar. 26, 1974

[54] PROCESS FOR MAKING DIARYL METHANES

[76] Inventor: William E. Smith, 1937 Townsend Rd., Schenectady, N.Y. 12309

[22] Filed: Apr. 26, 1972

[21] Appl. No.: 247,687

[52] U.S. Cl...... 260/613 R, 260/649 R, 260/619 A, 260/668 R
[51] Int. Cl............................................ C07c 41/00
[58] Field of Search............ 260/613, 248.6, 619 A, 260/613 R, 649 R, 668 R

[56] References Cited
UNITED STATES PATENTS
1,793,311  2/1931  Ellis ................................. 260/619 A
2,334,408  11/1943  Gump et al. ..................... 260/619 A
2,433,143  12/1947  Mohrman ........................ 260/619 A
2,464,207  3/1949  Bender et al. ................... 260/619 A FOREIGN PATENTS OR APPLICATIONS
160,258  3/1921  Great Britain ................... 260/248.6

*Primary Examiner*—Bernard Helfin
*Attorney, Agent, or Firm*—Joseph T. Cohen; Jerome C. Squillaro

[57] ABSTRACT

Aryl substituted methanes can be prepared by effecting reaction between an aromatic compound containing a nuclearly bonded hydrogen and hexamethylenetetramine in the presence of an acidic agent selected from the class consisting of sulfuric acid and phosphoric acid.

6 Claims, No Drawings

PROCESS FOR MAKING DIARYL METHANES

This invention is concerned with a process for making aryl substituted methanes. More particularly, the invention is concerned with a process for preparing diaryl substituted methanes which comprises effecting reaction between a compound corresponding to the general formula

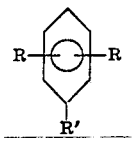

with hexamethylenetetramine in the presence of an acid selected from the class consisting of sulfuric acid and phosphoric acid, where R and R' are members selected from the class consisting of hydrogen, alkyl radicals of from 1 to 6 carbon radicals, phenyl radicals, alkoxy radicals containing from 1 to 4 carbon atoms and the phenoxy radical, and in addition R' can be the hydroxyl radical or a halogen (e.g., chlorine, bromine, fluorine, etc.).

Diaryl methane derivatives have been obtained in the past by the reaction of aromatic compounds with formaldehyde (or polymers of formaldehyde) in the presence of an acidic medium, as is more particularly disclosed in Dutch Pat. No. 81,020 (1957), U.S. Pat. No. 2,933,450, and U.S. Pat. No. 2,981,765. However, to the best of my knowledge, diaryl methane derivatives have not been prepared using hexamethylenetetramine which has been found to be a convenient agent for this purpose.

I have now discovered that I am able to obtain diaryl methane derivatives in good yield by reacting aromatic compounds with hexamethylenetetramine in the presence of an acidic agent (hereinafter so designated) selected from the class consisting of sulfuric acid and phosphoric acid. Unexpectedly, it was found that the use of such acids produced the desired diaryl methane derivatives in relatively good yields with little or no evidence of resin formation. This is to be contrasted with the undesirable level of resin formation which occurs when aromatic compounds, such as 2,6-xylenol, are reacted with hexamethylenetetramine in the presence of hydrochloric acid.

By means of my process, a large variety of aromatic compounds can be transformed to the corresponding diaryl methane derivatives. In addition to the reaction going quite readily at moderate temperatures under rather mild conditions, the yields of the diaryl methane derivatives are generally quite high, usually well in excess of 50 percent. Moreover, the products obtained are easily isolated in a relatively pure state by usual extraction and distillation techniques.

Among the alkyl radicals which R and R' may be are, for instance, methyl, ethyl, propyl, isopropyl, butyl, hexyl, 2-ethyl butyl, etc.; alkoxy radicals, e.g., methoxy, ethoxy, isopropoxy, butoxy, etc.

Among the compounds which may be employed in the practice of the invention may be mentioned, for instance, benzene, toluene, xylene (including all its isomers), 1,3-dibutyl benzene, anisole, methoxybenzene, ethoxybenzene, butoxybenzene, phenol, ortho-cresol, meta-cresol, the various isomeric xylenols, including 2,6-dimethyl phenol; 2,6di(t-butyl)phenol, 2-phenoxyphenol, 2,4-diphenoxyphenol, 1,3-dimethoxybenzene, 2,6-diethoxyphenol, 2-methyl-3-ethylbenzene, 2-methyl-6-ethylphenol, chlorobenzene, fluorobenzene, 2-methylchlorobenzene, 3-methoxychlorobenzene, 2,6-dimethylchlorobenzene, 4-phenoxyphenol, etc.

In general it is only necessary to mix the aromatic compound with the hexamethylenetetramine, add a sufficient amount of acid agent which can act not only as a catalyst but also as a solvent for the reaction. Thereafter, the reaction mixture can be heated at temperatures of the order of 50° to 150° C. or higher for times ranging from about 1 hour to 24 hours or more depending on the reactants employed, the temperature, etc. The acidic agent can be readily removed by distillation, preferably under reduced pressure, and thereafter further treated to yield the desired reaction product.

Generally, it is adequate to employ 1 mol hexamethylenetetramine per mol of the aromatic compound. Obviously, reasonable excess concentrations of either of these two reactants can be employed without departing from the scope of the invention. Thus, for each mol of the aromatic compound, one can employ, for instance, from about 0.5 to about 1.8 mols of the hexamethylenetetramine.

The acidic agent can be any of the commercially available sulfuric or phosphoric acids, but advantageously both the sulfuric acid and the phosphoric acid are aqueous forms of these acids in order to insure better interaction with the reactants. Generally, the phosphoric acid agent may be in the form of about a 75 to 90 percent phosphoric acid solution while the sulfuric acid may be from about a 75 to 98 percent concentrated aqueous sulfuric acid solution.

The concentration of the acidic agent can be varied quite broadly. Generally enough of the acidic agent is used to form a solution of the ingredients and also to form an adequate liquid medium for the reaction to take place. On a weight basis, one may employ from about 1.5 to 10 parts of the acidic agent per part of the total weight of the two main reactants, namely, the hexamethylenetetramine and the aromatic compound. The presence of inert solvents is not precluded; a solvent which has been especially useful for the purpose is nitrobenzene, especially when the aromatic compound is immiscible in the acid medium.

In order that those skilled in the art may better understand how the present invention may be practiced, the following examples are given by way of illustration and not by way of limitation.

EXAMPLE 1

A solution of 7.0 grams hexamethylenetetramine (0.05 mol) in a mixture of 150 ml. anisole and 200 ml. 86 percent aqueous phosphoric acid was heated at 80° C. for about 5 hours. The resultant solution was cooled and combined with 600 ml. ice-water. Extraction with diethyl ether and distillation of the extract yielded 37.8 grams (about a 55 percent yield) of isomers of idanisylmethane having the general formula

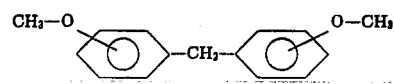

and having a boiling point range of 140°–156° C. at 0.8 mm. The identity of this composition was established by mass spectrum analysis. The molar ratios of the isomers were as follows:

para,para': para,ortho': ortho,ortho' = 12.7:3.8:1

EXAMPLE 2

A solution of 300 ml. chlorobenzene, in a mixture of 14.0 grams of hexamethylenetetramine (0.10 mol) and 100 ml. 96 percent aqueous $H_2SO_4$ was heated at 30° C. for about 16 hours. The resultant solution was cooled, combined with 600 ml. ice-water and thereafter isolated similarly as was done in Example 1 to give 68.8 grams (about a 48 percent yield) of isomers of bis-(chlorophenyl) methane having the general formula

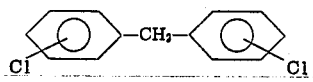

The molar ratios of the isomers were as follows: para,para': para,ortho': ortho:ortho' = 2.7:3.7:1

EXAMPLE 3

Employing essentially the same conditions and 86 percent aqueous phosphoric acid as in Example 1, 2,6-xylenol was reacted with hexamethylenetetramine in a molar ratio of 2 mols of the former to 1 mol of the latter, to give the corresponding diaryl methane derivative having the formula

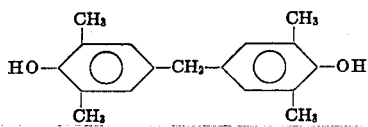

in about an 82 percent yield.

EXAMPLE 4

Toluene was reacted with hexamethylenetetramine in the same manner as in Example 1 with the exception that the acidic catalyst was a mixture, in a 1:1 weight ratio, of the 96 percent sulfuric acid and 86 percent phosphoric acid. The reaction conditions were essentially the same as those in Example 1 and the reaction product was worked up similarly to give a 71 percent yield of a mixture of isomers of the diaryl methane derivative having the general formula

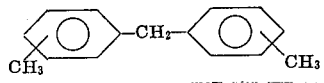

The molar ratios of the isomers were as follows: para,para': para,ortho': ortho,ortho' = 3.3:4.3:1

EXAMPLE 5

When t-butylbenzene was reacted with hexamethylenetetramine in a molar ratio of 5 mols of the former to 1 mol of the latter in the presence of 96 percent aqueous sulfuric acid using nitrobenzene as a cosolvent, there was obtained the diaryl methane derivative thereof in a yield of about 80 percent having the formula

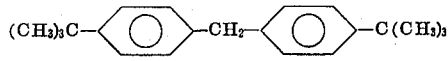

EXAMPLE 6

When benzene was reacted with hexamethylenetetramine in the same manner as in Example 1 in the presence of 96 percent aqueous sulfuric acid, a 31 percent yield of diphenylmethane was obtained.

It will of course be apparent to those skilled in the art that in addition to the aromatic compounds described in the preceding examples, other aromatic compounds many examples of which have been given above can be used without departing from the scope of the invention. Additionally, the conditions employed for making the diarylmethanes can be varied widely as is clearly pointed out in the preceding description.

The diaryl methane derivatives obtained in accordance with the present invention have many uses. Particularly, they can be employed as heat transfer fluids and intermediates in the preparation of dyes, or they can be reacted with other reagents such as nitric acid to form the nitro group which in turn can be reduced to make the diamino compound. These diamino compounds can be then reacted with anhydrides or dicarboxylic acids to make polymeric compositions useful in the molding and laminating arts.

What I claim as new and desire to secure by Letters Patent:

1. The process for preparing diaromatic substituted methanes which comprise effecting reaction at a temperature ranging up to 150°C between a compound corresponding to the general formula

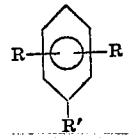

with hexamethylenetetramine in the presence of an acid selected from the class consisting of sulfuric acid and phosphoric acid where R and R' are members selected from the class consisting of hydrogen, alkyl radicals of from 1 to 6 carbon radicals, phenyl radicals, alkoxy radicals containing from 1 to 4 carbon atoms and the phenoxy radical, and in addition R' can be the hydroxyl radical or a halogen, the concentration of the acid being sufficient to form a solution of the ingredients and also to form an adequate liquid medium for the reaction to take place.

2. The process as in claim 1 wherein the aromatic compound is benzene.

3. The process as in claim 1 wherein the aromatic compound is chlorobenzene.

4. The process as in claim 1 wherein the aromatic compound is anisole.

5. The process as in claim 1 wherein the aromatic compound is 2,6-xylenol.

6. The process as in claim 1 wherein the aromatic compound is toluene.

* * * * *